United States Patent
Arunkumar (10) Patent No.: US 7,606,908 B2
(45) Date of Patent: Oct. 20, 2009

(54) SPEEDY DELIVERY OF COMMUNICATION TO A VEHICLE

(75) Inventor: Uma Arunkumar, Novi, MI (US)

(73) Assignee: General Motors Corporation, Detroit, MI (US)

( * ) Notice: Subject to any disclaimer, the term of this patent is extended or adjusted under 35 U.S.C. 154(b) by 770 days.

(21) Appl. No.: 10/079,865

(22) Filed: Feb. 21, 2002

(65) Prior Publication Data

US 2003/0158946 A1 Aug. 21, 2003

(51) Int. Cl.
G06F 15/16 (2006.01)
H04M 1/64 (2006.01)

(52) U.S. Cl. .............. 709/227; 709/206; 379/88.04

(58) Field of Classification Search ........... 709/227, 709/202, 203, 206; 379/88.04; 701/48, 213–216; 340/988–996; 455/456.3
See application file for complete search history.

(56) References Cited

U.S. PATENT DOCUMENTS 5,559,860 A * 9/1996 Mizikovsky .............. 455/413
2002/0042266 A1 * 4/2002 Heyward et al. .......... 455/414
2002/0128000 A1 * 9/2002 do Nascimento, Jr. ...... 455/414
2003/0103599 A1 * 6/2003 Jijina et al. ............... 379/67.1
2003/0144005 A1 * 7/2003 Videtich .................. 455/456

OTHER PUBLICATIONS

U.S. Appl. No. 10/021,704, filed Dec. 13, 2001, Uma Arunkumar.

* cited by examiner

Primary Examiner—Peling A Shaw (57) ABSTRACT

An apparatus, method, and a computer program on a computer readable medium are provided for speedy delivery of a communication for a customer from a server to a client vehicle communication unit (VCU) installed in a vehicle of the customer, by establishing a connection between the server and the client VCU, and acquiring an ignition status from the client VCU as an indication of whether the customer is available in the vehicle for receiving the communication. The communication may be delivered immediately upon acquiring an IGNITION ON status. The message is stored if an IGNITION OFF status is acquired, and available for immediate delivery when the ignition is next turned on.

22 Claims, 9 Drawing Sheets

SPEEDY DELIVERY OF COMMUNICATION TO A VEHICLE

TECHNICAL FIELD OF THE INVENTION

This invention relates to mobile communication systems, and more particularly to expedited delivery of communications, such as messages, data and documents, to a mobile communication unit mounted in a vehicle.

BACKGROUND OF THE INVENTION

Modern vehicles often include an on board vehicle communication unit (VCU) capable of receiving communications such as telephone calls, voice mail messages, facsimile (FAX) transmissions, E-mail messages, and data transmissions. Immediate delivery of such communications to the customer operating the vehicle is often not possible because the customer is not in the vehicle at the time the communication is originally sent. If the vehicle is parked, and the ignition is off, the VCU may be inoperative and unable to receive the communication. Even while the vehicle is in operation and the VCU is operational, the vehicle may momentarily be out of range of a server attempting to send the communication to the VCU, or the radio telephone connection between the server and the vehicle may be blocked by the terrain between the vehicle and the server. Such difficulties in delivering communications cause many failed delivery attempts, accompanied by much frustration and time wasted for persons attempting to send and wanting to receive communications.

What is needed, therefore, is a solution to one or more of the problems defined above for providing speedy delivery of communications from a server to a customer in a vehicle.

SUMMARY OF THE INVENTION

My invention provides speedy delivery of a communication for a customer, from a server to a client vehicle communication unit (VCU) installed in a vehicle of the customer, by establishing a connection between the server and the client VCU, and acquiring an ignition status from the client VCU as an indication of whether the customer is available in the vehicle for receiving the communication. The communication may be delivered immediately upon acquiring an IGNITION ON status. The message may be stored if an IGNITION OFF status is acquired, for immediate delivery at a later time when an IGNITION ON status is acquired.

My invention may take the form of an apparatus, method, or a computer program on a computer readable medium for speedy delivery of the communication.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 4:
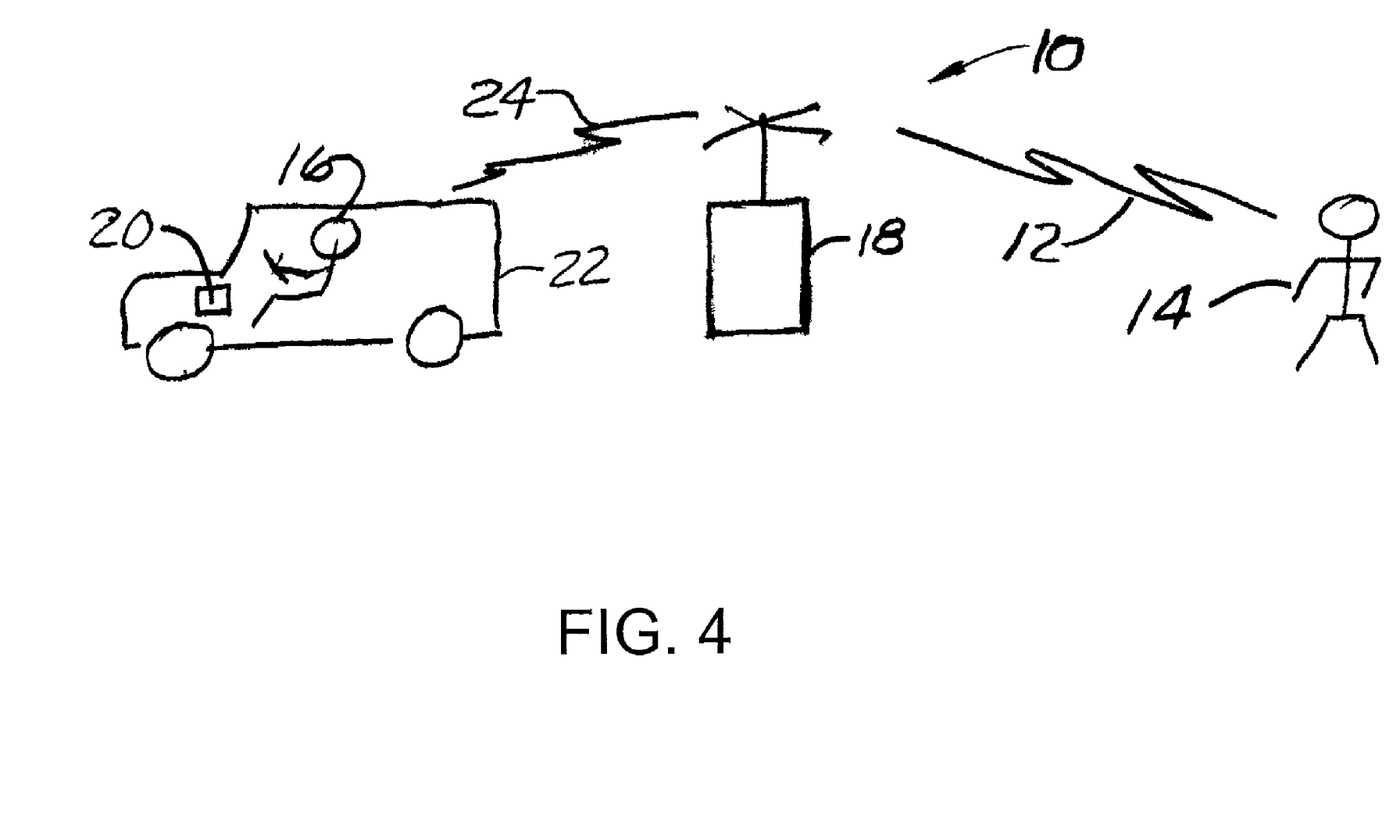
FIG. 4 is a schematic illustration of a system for speedy delivery of communications from a third party to a customer in a vehicle, according to my invention.

FIG. 4 depicts an exemplary embodiment of an apparatus in the form of a system 10, according to my invention, for delivering a communication 12 from a third party sender 14 for a customer 16, from a server 18 to a client vehicle communication unit (VCU) 20 installed in a vehicle 22 of the customer 16. The system 10 includes hardware and/or software in the server 18, the client VCU 20, and the vehicle 22 for establishing a connection 24 between the server 18 and the client VCU 20, and for acquiring an ignition status of the vehicle 22 from the client VCU 20 as an indication of whether the customer 16 is available in the vehicle 22 for receiving the communication 12.

The system 10 further includes hardware and/or software in the server 18, the client VCU 20, and the vehicle 22 for delivering the communication 12 to the customer 16 upon acquiring an IGNITION ON status, and for storing the communication 12 until an IGNITION ON status is acquired, in accordance with the exemplary embodiments of methods of practicing my invention described in detail below, or other embodiments of methods within the scope of the appended claims.

The term "communication," when used herein as a noun, is intended to include all forms of messages, data, and documents currently available for delivery via a radio telecommunications system, and such additional forms of information as may become deliverable via such systems in the future. It is expressly intended that a communication 12 for delivery in accordance with my invention may take the form of a voice-mail message, a facsimile (FAX), an E-mail message, or a transfer of data.

The server 18, client VCU 20, and vehicle 22 used in practicing my invention, and any software programs executable therein in relation to practicing my invention, are uniquely configured such that the client VCU 20 and the server 18 can acquire an ignition status from the vehicle 22. Those having skill in the art will recognize, however, that the unique structure and software required for practicing my invention may generally be provided through adaptations and additions of elements of conventional construction known in the art. Such adaptations and additions are not discussed in detail herein, therefore, except with regard to specific aspects or features of my invention described below and in the accompanying drawings.

Figure 1:
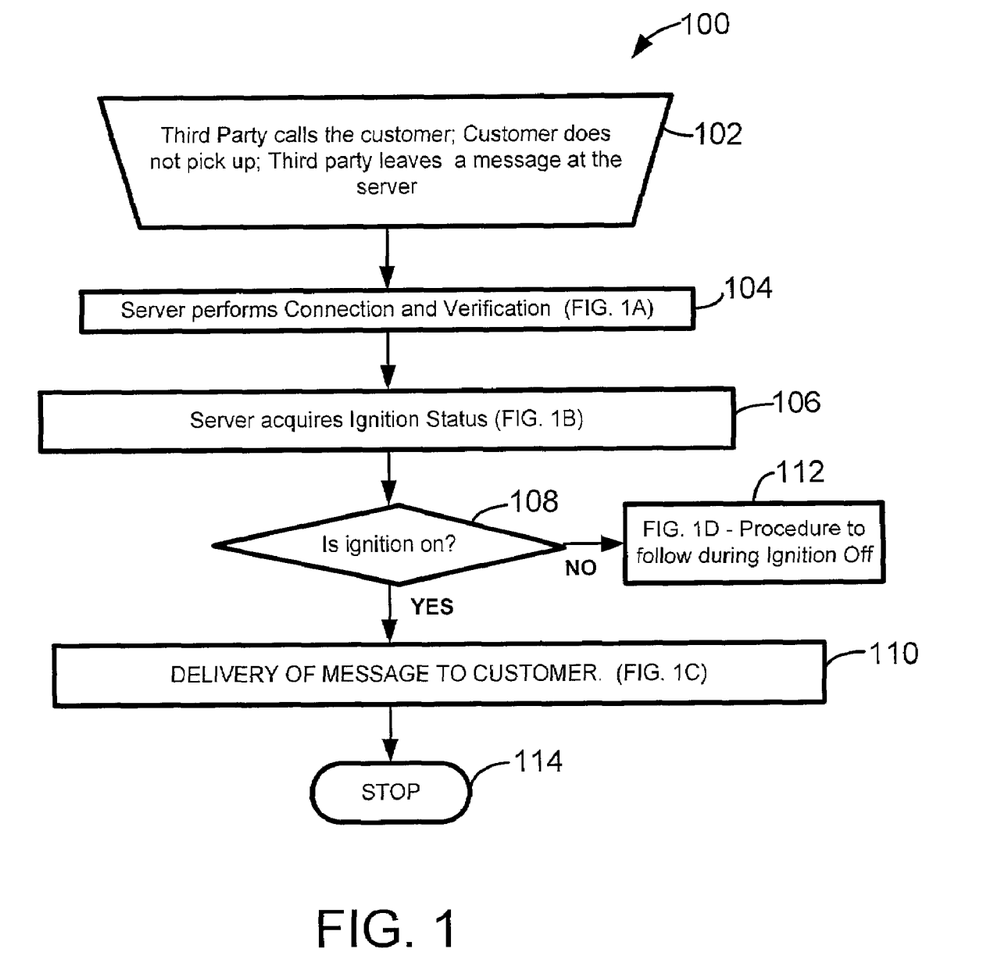
FIG. 1 is a flowchart for a first exemplary embodiment of a method according to my invention, in which communications awaiting speedy delivery are stored at a server.

FIG. 1 depicts a first exemplary embodiment of a method 100, according to my invention. For purposes of facilitating understanding, a voice mail message will be used to represent the communication 12 in describing the first exemplary embodiment of the method 100, but it will be understood that the method 100 can be utilized for other types of communications as well.

The method 100 begins at block 102, when the third party sender 14 attempts to place a telephone call to the customer 16, and the customer 16 does not immediately pick up the call. The sender 14 leaves a communication, in the form of a voice mail 12, at the server 18. The server 18 then performs the connection and verification routine 104, as depicted in FIG. 1A and described in greater detail below.

If connection and verification 104 are accomplished, the server 18 then sends a query to the client VCU 20 and acquires an ignition status, as shown in block 106, and FIG. B, and described in greater detail below. If an IGNITION ON status is acquired, as shown at diamond 108, the method proceeds to the delivery routine 110, as depicted in FIG. 1C and described in greater detail below. After the message 12 is delivered, the method 100 terminates as shown at block 114. If an IGNITION OFF status is acquired, the method proceeds to the delayed delivery routine 112, as depicted in FIG. 1C and described in greater detail below.

Figure 1A:
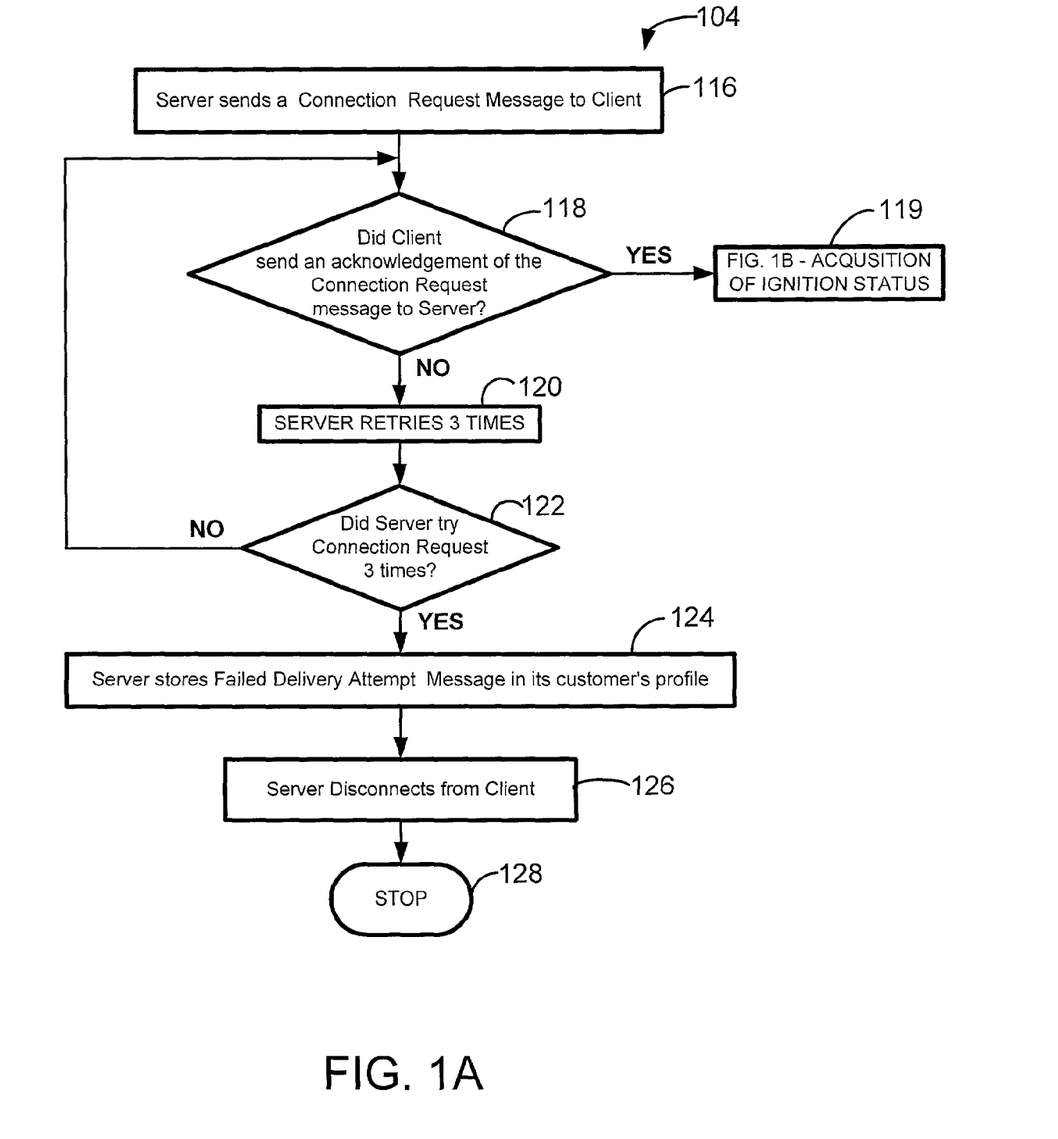
FIGS. 1A-1E are flowcharts illustrating further steps for carrying out the method of FIG. 1.
Figure 1B:
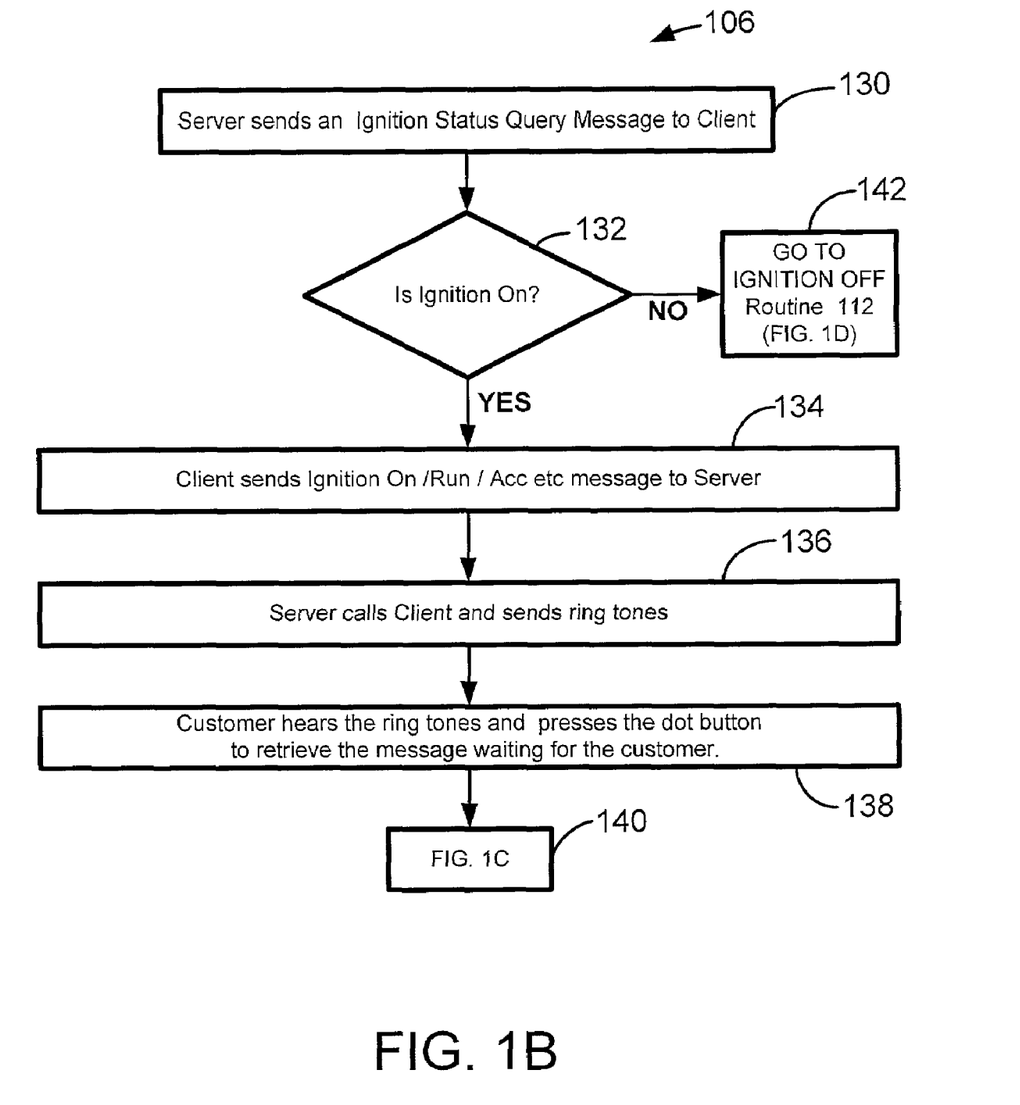
Figure 1C:
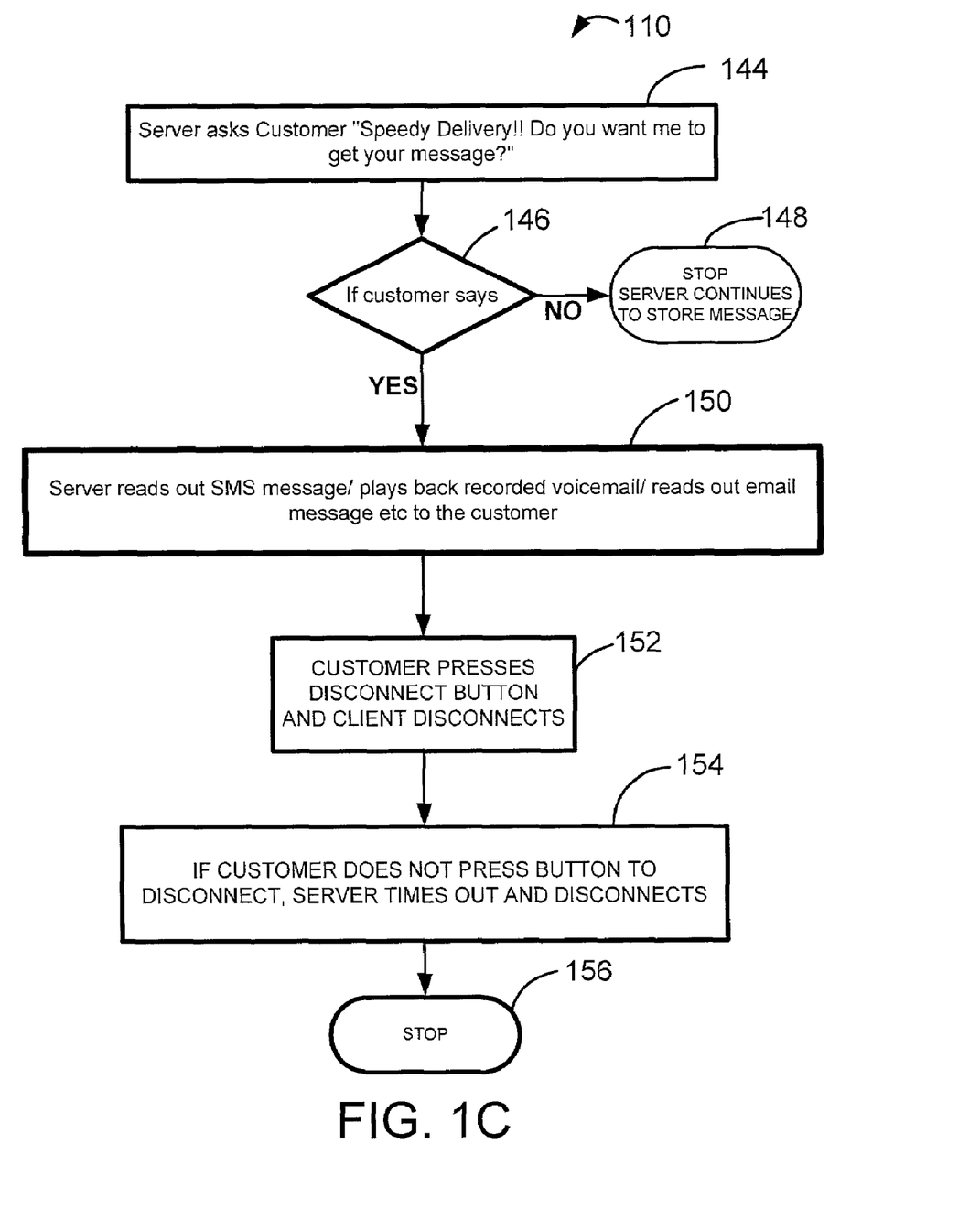

As shown in FIG. 1A, the connection and verification routine 104 includes an attempt by the server 18 to establish a connection with the client VCU 20 according to standard radio telephone operation, as shown in block 116. If the client VCU 20 does not send an acknowledgement of the set-up connection message from the server 18, as shown in diamond 118, the server 18 retries three times to establish connection and verification, as shown by block 120 and diamond 122. If the server 18 cannot establish connection and verification after three tries, the message 12 is stored in the server as a failed delivery attempt as shown at block 124, the server 18 disconnects as shown at block 126, and the connection and verification routine 104 terminates as shown at block 128.

If the server 18 determines at diamond 118 that the client VCU 20 has responded with an acknowledgement of the set-up connection message, the method 100 proceeds to the routine 106 for acquiring ignition status, as shown in FIG. 1B.

As shown in FIG. 1B, the routine for acquiring ignition status 106 begins at block 130 with the server 18 sending an ignition status query message to the client VCU 20. The client VCU 20 is configured to continuously monitor ignition status of the vehicle 22, or to query the vehicle 22 for ignition status in response to the ignition status query message from the server 18. If the ignition is in an ON, RUN, or ACCESORY mode, or any other mode other than OFF, that would indicate that the customer was in the vehicle 22 and available to receive an immediate communication.

If the ignition is in any mode other than OFF, (i.e. ON, RUN, or ACCESORY mode, etc.) as determined at diamond 132, the client VCU 20 sends an IGNITION ON status to the server 18, as shown at block 134. Those having skill in the art will recognize that the actual exchange between the server 18 and the client VCU 20 will involve codes or numerical indicators that indicate an ignition ON, RUN, or ACCESSORY mode, etc., but for the purpose of simplifying the description below, all of these modes and the related codes will be referred to as an IGNITION ON status.

Figure 1D:
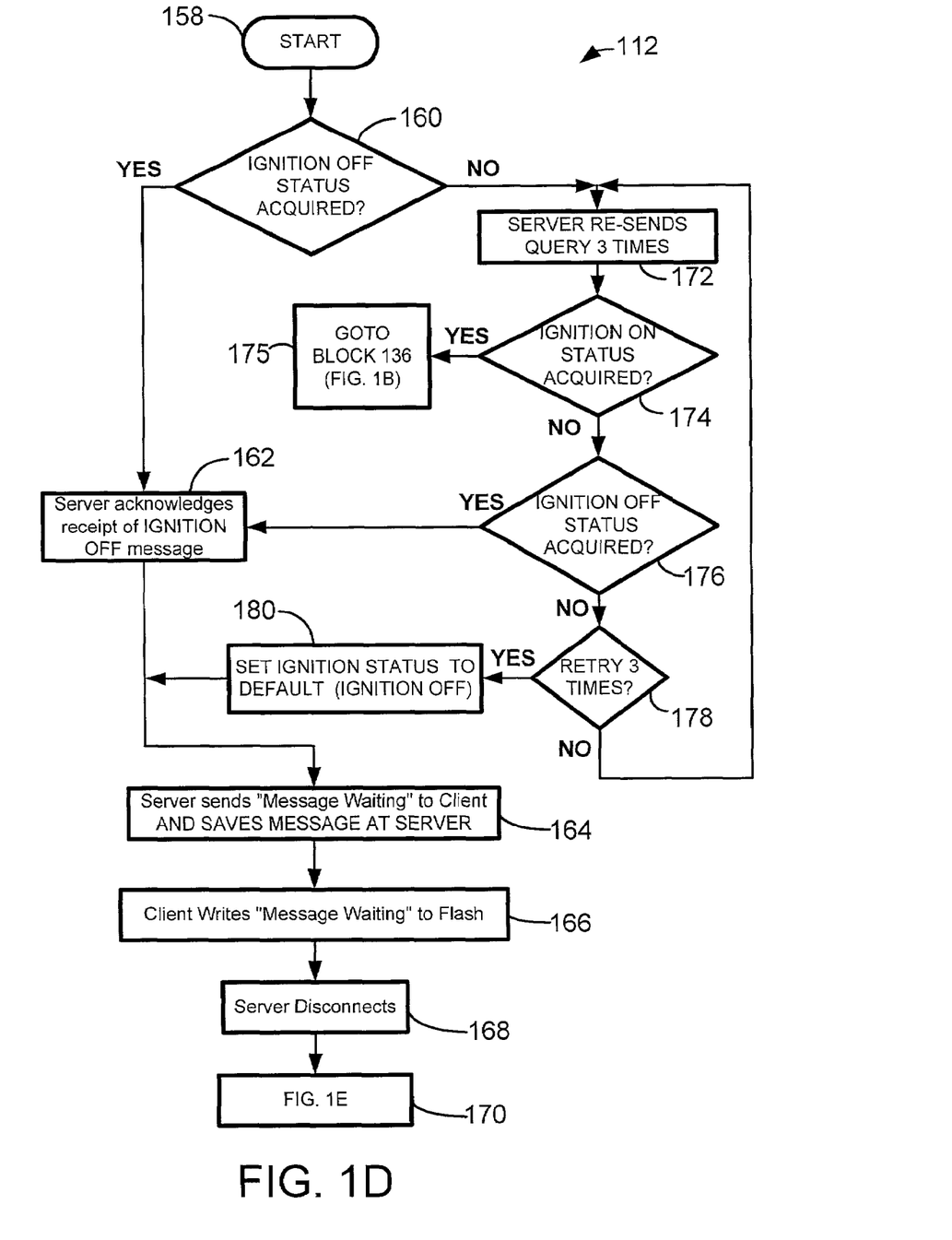

If an IGNITION ON status is acquired at diamond 132, the server 18 then calls the client VCU 20 and sends a ring tone, as shown at block 136. When the customer 16 responds to the ring tone by pressing a button, or responding with a proper voice command, as shown at block 138, the method 100 proceeds as shown in block 140 to the delivery routine 110, as shown in FIG. 1C and described in greater detail below. If an IGNITION ON signal is not received by the server at diamond 132, the acquire ignition status routine 106 proceeds as shown in block 142 to the IGNITION OFF routine 112, as shown in FIG. 1D and described in greater detail below.

As stated above and shown at block 140 in FIG. 1B, if the server 18 receives an IGNITION ON status at diamond 132 of FIG. 1B, the method 100 proceeds to the delivery routine 110, as shown in FIG. 1C. Delivery of the message 12 begins at block 144 of the delivery routine 110 with the server 18 sending a code that causes the client VCU 20 to annunciate that there is a message 12 for the customer 16 in the speedy delivery system 10 waiting to be received by the customer 16. Preferably the vehicle 22 and client VCU 20 are equipped with a loudspeaker and voice command recognition apparatus, such that annunciation can be accomplished by the loudspeaker broadcasting an audible query to the customer 16, such as: "Speedy delivery. Do you want to receive your message?" The annunciation may also preferably include a designation of the type of message (voice mail, E-mail, FAX, etc.) ready for speedy delivery.

If the customer 16 indicates a desire to not receive the message 12 by responding negatively, as shown at diamond 146, the server continues to store the message 12 for retrieval at a later time, as shown at block 148.

If the customer 16 indicates a desire to receive the message 12 by responding affirmatively at diamond 146, the server 18 and client VCU 20 play or read the message 12 to the customer 16, as shown at block 150. After the message 12 is read or played, the customer 16 disconnects from the server 18, as shown at block 152, or the server 18 times out and disconnects if the customer 16 does not disconnect, as shown at block 154, and the method 100 ends as shown at block 156.

As shown in FIG. 1B, if an IGNITION ON signal is not received by the server at diamond 132, the acquire ignition status routine 106 proceeds as shown at block 142 to the IGNITION OFF routine 112, as shown in FIG. 1D. There are three possibilities for why the server 18 did not receive an IGNITION ON status in response to the query sent by the server 18 at block 130 of FIG. 1B, after a connection is established an verified, as shown at block 119 of FIG. 1A.

The first possibility is that the vehicle 22 ignition is in the OFF mode, and the client VCU 20 has responded with a code indicating an IGNITION OFF status.

The second possibility is that, although the client VCU 20 is able to establish and maintain a connection with the server 18, there is a problem in acquiring or transmitting the ignition status to the server 18 resulting in neither an IGNITION ON or an IGNITION OFF status being acquired at the server 18. Problems in acquiring or transmitting the ignition status can result from equipment malfunctions in the server 18 or the client VCU 20, terrain interfering with the connection, or problems with the network.

The third possibility is that the client VCU 20 includes a feature that causes the client VCU 20 to go into a sleep cycle during IGNITION OFF status, with periodic wake cycles during the IGNITION OFF status, and that the client VCU 20 is in a sleep cycle when the server 18 queries the client VCU 20 regarding the ignition status. A sleep cycle is often provided in a battery-powered client VCU 20 to minimize power draw when the vehicle 22 is inoperative for extended periods. When such a client VCU 20 is in the sleep cycle, it can still establish communication with a server, but may not be capable of powering up to respond to the query regarding ignition status. As a result, the client VCU 20 can only respond with an IGNITION OFF status if the query reaches the client VCU 20 during a wake cycle.

Figure 1E:
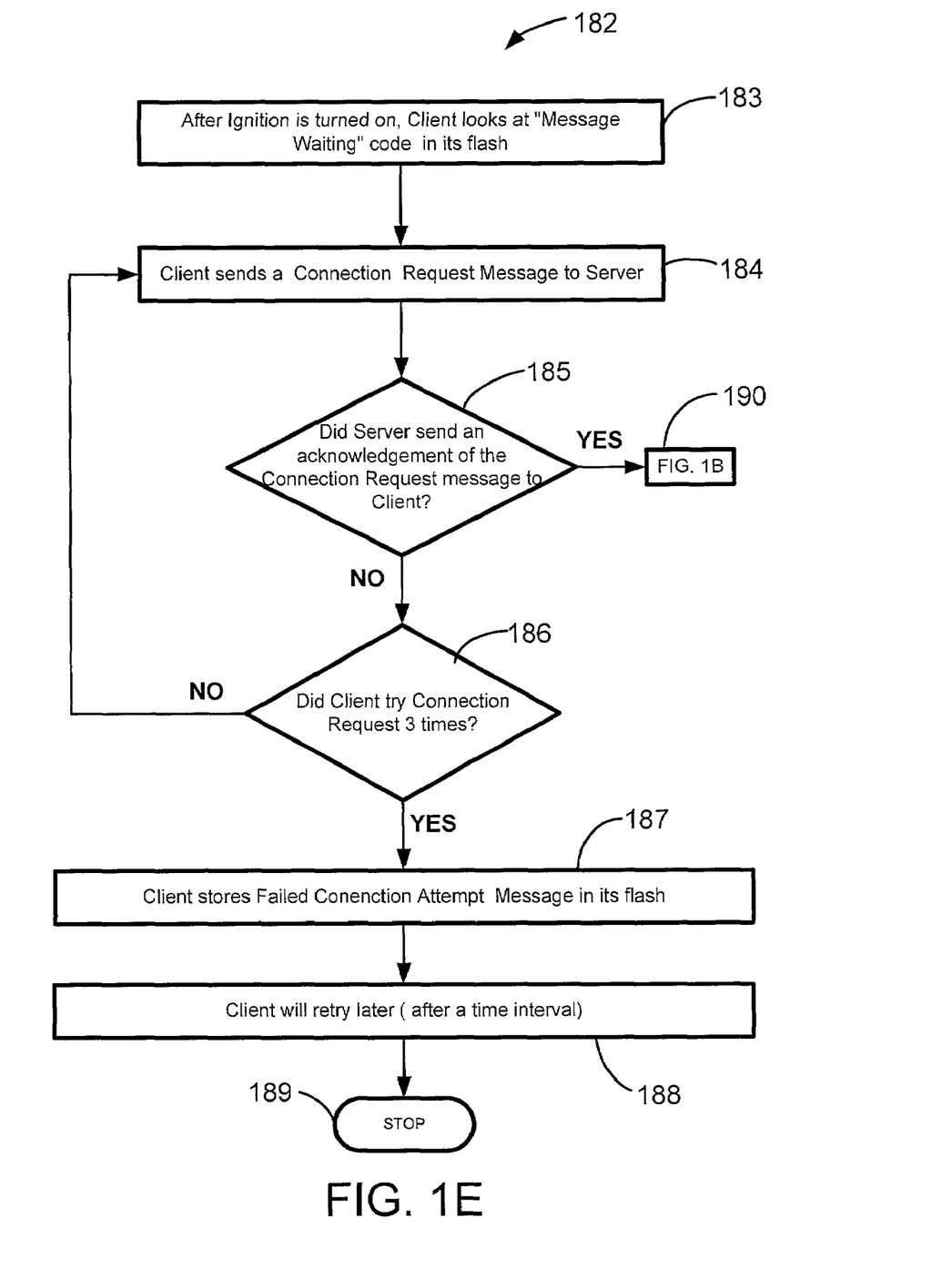

The ignition off routine 112 covers all three of the possibilities described above, leading to the server 18 not receiving an IGNITION ON status at diamond 132 of FIG. 1B. The ignition off 112 routine starts at block 158 and proceeds to diamond 160. If an IGNITION OFF status was received at the server 18 in response to the ignition status query, the ignition off routine 112 proceeds to block 162, wherein the server 18 acknowledges receipt of the IGNITION OFF status. The server 18 then sends a code representing an annunciation message, such as "Message Waiting," to the client VCU 20, and saves the message 12 at the server 18 for later retrieval, as shown at block 164. The annunciation message is stored in FLASH memory at the client VCU 20, as shown at block 166, and the server 18 disconnects from the client VCU 20 as shown at block 168. The actual message 12 saved at the server 18 is retrieved and delivered at a later time, in accordance with the delayed delivery routine shown in FIG. 1E, as indicated at block 170 of FIG. 1D.

If an IGNITION OFF status has not been acquired by the server 18, as shown at diamond 160 of FIG. 1D, the server 18 resends the query regarding ignition status three more times at intervals long enough to encompass at least one wake cycle of the client VCU 20, as shown by block 172 and diamonds 174, 176, and 178. If an IGNITION ON status is received at diamond 174, the ignition off routine 112 returns the method 100 to block 136 of the acquire ignition status routine 106, shown in FIG. 1B. If an IGNITION OFF status is received at diamond 176, the ignition off routine 112 proceeds to block 162. If after three retries the ignition off routine has not received either an IGNITION ON or an IGNITION OFF status, the ignition off routine 112 proceeds from diamond 178 to block 180 wherein the ignition status is set to a default value of IGNITION OFF, and the ignition off routine 112 proceeds to block 164. It may also be desirable to set a fault indicator at either or both of the server 18 and client VCU 20 if the ignition status is set to the default at block 180.

In the method of FIG. 1, if an IGNITION OFF status prevents immediate delivery of the message 12, the message 12 is stored at the server 18 until the next time that the vehicle ignition is turned on. When the vehicle ignition is turned on, as shown at block 183, of the delayed delivery routine 182 of FIG. 1E, the client VCU 20 recognizes the annunciation message that was stored in FLASH memory of the client VCU 20, at block 166 of FIG. 1D, and requests a connection to the server 18, as shown at block 184. If the server 18 responds with an acknowledgement of the connection request, as shown in diamond 185, the server 18 then initiates entry 190 into the acquire ignition status routine 106 at block 130, as shown in FIG. 1B, and the method 100 proceeds as described above. If the server 18 does not acknowledge the connection request, the client VCU 20 makes three attempts to establish a connection with the server 18, as shown at diamond 186. After three unsuccessful attempts to establish a connection, the client VCU 20 stores a FAILED CONNECTION ATTEMPT message in its FLASH memory, as shown in block 187. the client VCU 20 will retry later, after a time interval, to establish contact with the server 18 as shown at block 188. If no contact can be established on retry 188, the delayed delivery routine 182 terminates 189.

Figure 2:
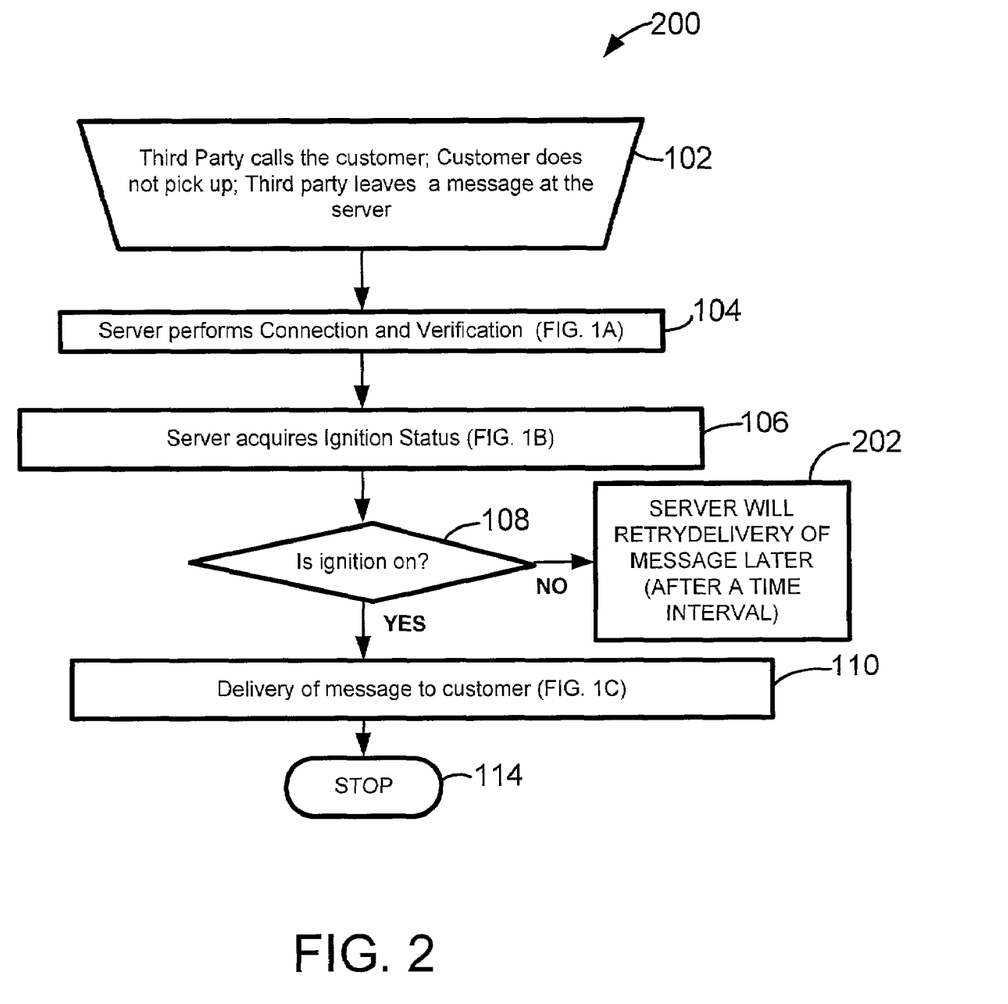
FIG. 2 is a flowchart of a second exemplary embodiment of a method according to the invention, in which communications awaiting delivery are stored at the server for later delivery to a client VCU in the customer's vehicle.

FIG. 2 illustrates an exemplary embodiment of a second method 200 according to my invention. The second method 200 illustrated in FIG. 2 is very similar to the embodiment of first method 100 described above. The elements of the second method 200 in FIG. 2 that are identical to an element of the first method 100 depicted in FIG. 1 are given the same reference numbers used in FIG. 1. As will be readily evident from comparing FIGS. 1 and 2, the only difference in the second method 200 of FIG. 2, is that upon failure to acquire an IGNITION ON status at diamond 108, the server 18 retries delivery of the message at a later time, after a time interval, as shown in block 202. Nothing is written or stored in the client VCU 20, and the routines 112 and 182 of method first 100, illustrated in FIGS. 1*d* and 1E respectively, are not used in second method 200. The second method 200 provides a degree of simplification in that fewer operations are carried out in the client VCU 20. In addition, the requirements for FLASH memory in the client VCU 20 are reduced, thereby allowing a reduction in cost of the client VCU 20.

Figure 3:
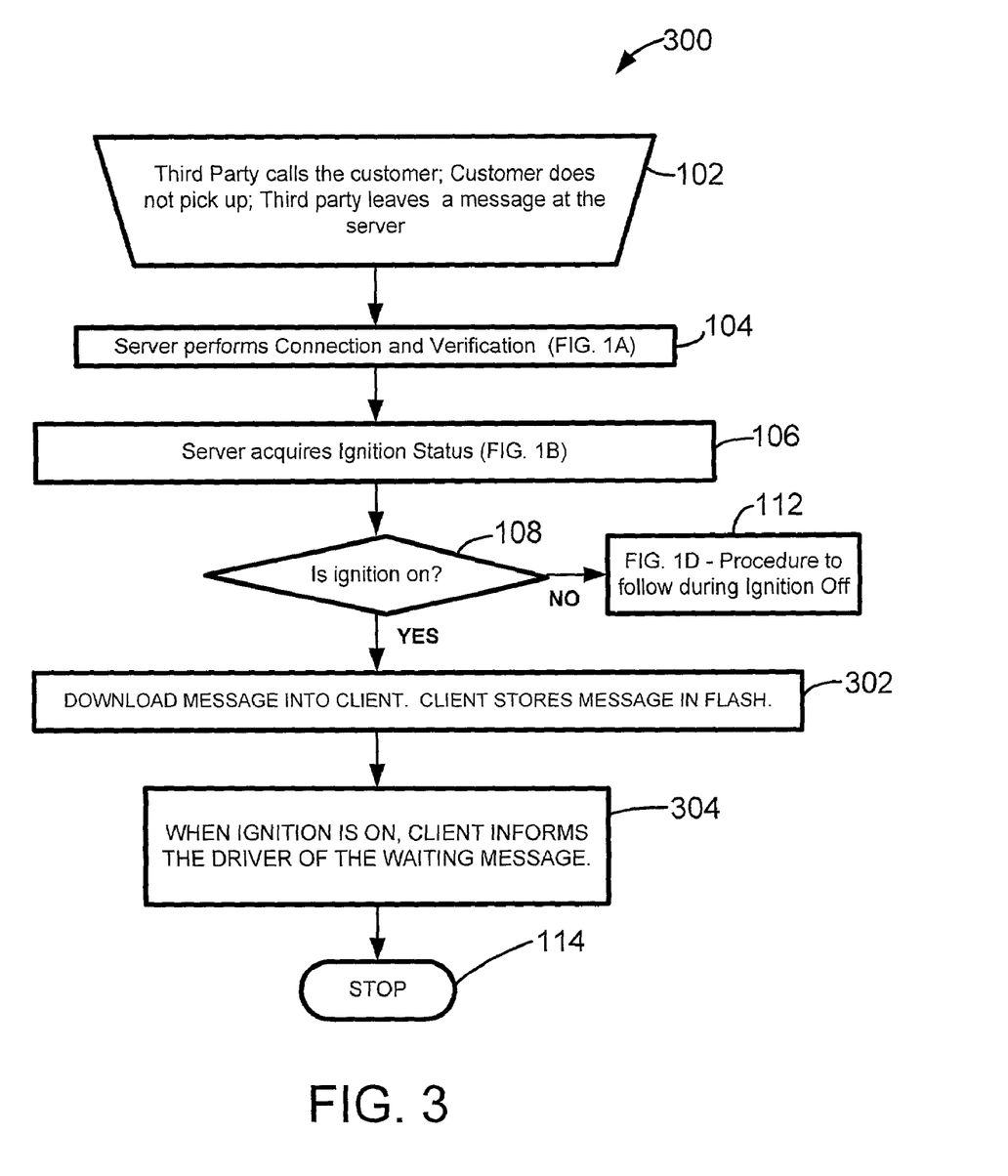
FIG. 3 is a flowchart of a third exemplary embodiment of a method according to my invention, in which communications awaiting delivery are stored in client VCU in the customer's vehicle, rather than at the server.

FIG. 3 depicts a third exemplary method 300 according to the invention. The third method 300 is similar to the embodiment of first method 100 described above. The elements of the third 300 in FIG. 3 that are identical to an element of the first method 100 depicted in FIG. 1 are given the same reference numbers used in FIG. 1. As will be readily evident from comparing FIGS. 1 and 3, the only difference in the third method 300 of FIG. 3, is that block 110 of the first method 100 is replaced with blocks 302 and 304 in the third method 300. The result of this change is, that upon acquiring an IGNITION ON status at diamond 108, the server 18 downloads the message 12 into the client VCU 20, where the message 12 is stored in FLASH memory as shown in block 302. Nothing is written or stored in the server 18. As shown in block 304, when the ignition is next turned on, the client VCU informs the customer of the message 12 awaiting delivery in the FLASH memory of the client VCU.

The third method 300 provides a degree of simplification for the server 18 with a corresponding increase in the capacity requirements for FLASH memory in the client VCU 20, which thereby increases the cost of the client VCU 20. In some embodiments of my invention, however, this cost may be offset by other advantages accruing from storing the message 12 locally in the client VCU 20. For example, storing the message 12 locally eliminates the need for the client VCU 20 to access the server 18 when retrieving the message 12, thereby allowing speedy delivery to be accomplished in even less time that with an embodiment using the first or second methods described above.

While the embodiments of my invention disclosed herein are presently considered to be preferred, various changes and modifications can be made without departing from the spirit and scope of the invention. The scope of the invention is indicated in the appended claims, and all changes or modifications within the meaning and range of equivalents are intended to be embraced therein.

I claim:

1. A method for notifying a customer of a message available for delivery via a client vehicle communication unit (VCU) installed in a vehicle of the customer, the method comprising the steps of:
   establishing a connection between a server and the client VCU;
   sending a query to the client VCU from the server for an indication of whether the customer is available in the vehicle for receiving the message;
   sending a message to the client VCU for delivery to the customer if the server receives the indication that the customer is available; and
   if the server does not receive the indication that the customer is available for receiving the message, then performing any one or more of the following:
   i) sending a failed delivery message to the client VCU,
   ii) sending the message to the client for storage on the client VCU, or
   iii) retrying delivery of the message to the client VCU at a later time after a time interval.

2. The method of claim 1, wherein the indication of whether the customer is available in the vehicle for receiving the message is an ignition status.

3. The method of claim 1, wherein the message is one of the group consisting of a voice message, a facsimile (FAX), an E-mail message, and a transfer of data.

4. The method of claim 1, wherein the step of sending a message to the client VCU for delivery to the customer further comprises annunciating to the customer the type of message available for delivery.

5. The method of claim 1, wherein the step of sending a message to the client VCU for delivery to the customer occurs after the vehicle ignition is turned on if the indication that the customer is available is not received by the server.

6. The method of claim 1, further comprising the steps of periodically sending a query to the client VCU from the server if the server fails to receive the indication that the customer is available in response to previous queries.

7. The method of claim 1, wherein sending a message to the client VCU for delivery to the customer includes broadcasting an audible message to the customer inside the vehicle.

8. The method of claim 1, further comprising the step of storing a message for later annunciation to the customer on the client VCU upon the server acquiring an IGNITION OFF status.

9. The method of claim 8, further comprising the step of sending a code to the client VCU from the server representative of the message for later annunciation.

10. A method for delivering a message for a customer from a server to a client vehicle communication unit (VCU) installed in a vehicle of the customer, the method comprising the steps of:
    establishing a connection between a server and the client VCU;
    sending a query to the client VCU from the server for an ignition status as an indication of whether the customer is available in the vehicle for receiving the message;
    re-sending the query to the client VCU from the server for an ignition status if no ignition status is returned from the client VCU to the server; and
    annunciating to the customer that a message is available for delivery if the server receives an ignition status indicating that the customer is available.

11. The method of claim 10, wherein the step of annunciating to the customer that a message is available for delivery further comprises annunciating the type of communication available for delivery.

12. The method of claim 10, wherein the step of annunciating to the customer that a message is available for delivery occurs after the vehicle ignition is turned on if no ignition status indicating that the customer is available is received by the server.

13. The method of claim 10, wherein annunciating the communication includes broadcasting an audible message to the customer inside the vehicle.

14. The method of claim 10, further comprising the step of sending an IGNITION ON message to the server from the client VCU when the ignition mode changes from an off mode another mode.

15. The method of claim 10, further comprising the step of storing a message for later annunciation to the customer on the client VCU upon the server acquiring an IGNITION OFF status.

16. The method of claim 15, further comprising the step of sending a code to the client from the server representative of the message for later annunciation.

17. The method of claim 10, wherein the customer initiates delivery of the message with a verbal command.

18. The method of claim 10, further comprising the step of delaying delivery of the message to client VCU upon acquiring an IGNITION OFF status.

19. The method of claim 10, further comprising the step of storing the message at the server upon acquiring an IGNITION OFF status.

20. A method for notifying a customer of a message available for delivery via a client vehicle communication unit (VCU) installed in a vehicle of the customer, the method comprising the steps of:
    attempting to establish a connection between a server and the client VCU;
    if the connection was not established, then performing any one or more of the following:
        i) retrying to establish a connection between the server and the client VCU, or
        ii) storing a failed delivery message;
    if the connection between the server and the client VCU is established, then sending a query to the client VCU from the server for an ignition status as an indication of whether the customer is available in the vehicle for receiving the message; and
    if the server receives an ignition status indicating that the customer is available, then sending a message to the client VCU for delivery to the customer.

21. The method of claim 20, wherein the step of sending a message to the client VCU for delivery to the customer further comprises sending ring tones to the client VCU.

22. The method of claim 20, wherein the step of sending a message to the client VCU for delivery to the customer further comprises the customer initiating delivery of the message to the customer.

* * * * *